United States Patent [19]

Haring, Jr. et al.

[11] 4,182,004
[45] Jan. 8, 1980

[54] MEAT HOOK

[76] Inventors: Stanley S. Haring, Jr., 440 Oil Hill Rd.; Gary M. Happy, 531 N. Taylor, both of ElDorado, Kans. 67042

[21] Appl. No.: 881,728

[22] Filed: Feb. 27, 1978

[51] Int. Cl.² ............................................. A22C 15/00
[52] U.S. Cl. .................................................... 17/44.2
[58] Field of Search ........................................ 17/44.2

[56] References Cited
U.S. PATENT DOCUMENTS 3,854,689  12/1974  Engels ............................. 17/44.2 X

FOREIGN PATENT DOCUMENTS 76587   12/1974  Australia ................................. 17/44.2
638435  3/1964   Belgium .................................. 17/44.2
370787  5/1939   Italy ...................................... 17/44.2

Primary Examiner—Willie G. Abercrombie
Attorney, Agent, or Firm—John H. Widdowson

[57] ABSTRACT

An improved one-piece thermoplastic meat hook for use in carrying meat products such as beef, pork, etc. The meat hook is a single molded piece of plastic formed by injection molding and characterized by having an annular cross section with reinforcing stiffening ribs around semicircular end portions and along the length thereof for increasing the amount of tensional load that can be placed thereon.

2 Claims, 8 Drawing Figures

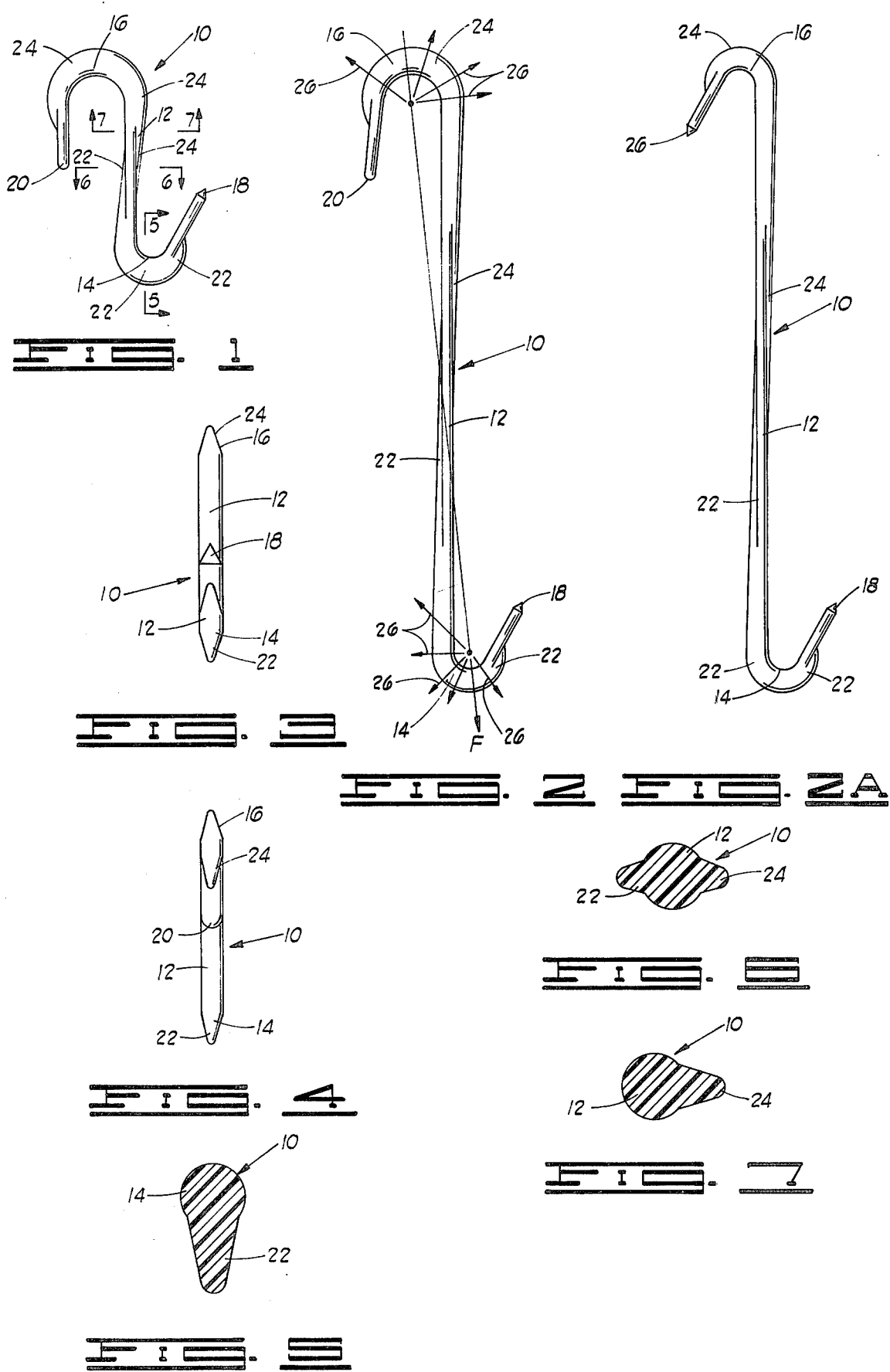

MEAT HOOK

BACKGROUND OF THE INVENTION

The subject invention relates generally to a meat hook used in suspending meat products therefrom and more particularly, but not by way of limitation, to an improved lightweight thermoplastic meat hook.

Heretofore, there have been similar types of meat hooks made of thermoplastic resins and lightweight plastics. In particular, a lightweight suspension device is disclosed in U.S. Pat. No. 3,488,025 to Roland. Also, a load bearing hook made of heavy-duty corrosion resistant plastic and having stiffening ribs for reinforcing the hook is disclosed in U.S. Pat. No. 3,854,689 to Engels. While these inventions are similar in some respects to the subject invention, they do not provide the specific structure and the improved design characteristics for increasing the amount of tensional load that can be placed on a plastic hook and prevent the breakage thereof when carrying heavy meat product loads over an extended period of time.

SUMMARY OF THE INVENTION

The subject invention provides a single molded, one-piece thermoplastic meat hook formed by injection molding. The invention is rugged in construction, inexpensive, corrosion resistant, and greatly reduces the overall weight of prior art stainless steel and galvanized meat hooks used in the transportation of meat products. The reduced weight of the improved meat hooks allows additional meat products to be transported without overloading the vehicle.

The improved meat hook is reinforced by stiffening ribs integrally formed around the outer circumference of semicircular end portions and along the length of an elongated shank of the meat hook, thereby providing a lightweight plastic meat hook which can carry over four times the tensional load of prior art plastic meat hooks having only an annular cross section.

The meat hook is characterized by having a pointed end in the semicircular bottom portion for ease in receiving meat products thereon. The semicircular top portion may also have a pointed end portion with similar dimensions to the bottom portion making the meat hook reversible.

The meat hooks may be easily color coded to identify the owner of the hooks and help deter theft of the hooks.

The improved thermoplastic meat hook includes an elongated shank having an annular cross section. Integrally attached to the lower end of the shank is a semicircular bottom portion with an annular cross section and a stiffening rib extending around the outer circumference of the bottom portion. Integrally attached to the top end of the shank is a semicircular top portion with an annular cross section and a stiffening rib extending around the outer circumference of the top portion.

The advantages and objects of the invention will become evident from the following detailed description when read in conjunction with the accompanying drawings which illustrate the preferred embodiments of the invention.

BRIEF DESCRIPTION OF THE DRAWINGS

In FIG. 1, a side view of the meat hook is illustrated.

In FIG. 2, an alternate embodiment of the meat hook is illustrated.

In FIG. 2A, a side view of the meat hook illustrated in FIG. 2 is shown having two pointed ends.

FIG. 3 illustrates a front view of the meat hook shown in FIG. 1.

FIG. 4 is a rear view of the meat hook shown in FIG. 1.

FIG. 5 illustrates a cross section of the meat hook taken along lines 5—5, shown in FIG. 1.

FIG. 6 illustrates a cross sectional view of the meat hook in FIG. 1 taken along lines 6—6.

FIG. 7 illustrates a cross sectional view of the meat hook shown in FIG. 1 taken along lines 7—7.

DETAILED DESCRIPTION OF THE DRAWINGS

In FIG. 1, a side view of a meat hook is shown and designated by general reference numeral 10. The meat hook 10 includes an elongated shank 12 with a semicircular bottom portion 14 and a semicircular top portion 16 integrally attached to the ends of the shank 12. The bottom portion 14 includes a pointed end 18 which is used for inserting through a portion of a meat product suspended from the hook 10. The top portion 16 includes a rounded end 20 which is received over a support rack. The support rack and suspended meat product are not shown in the drawings.

The meat hook 10 is formed by injection molding from a single molded piece of thermoplastic and is characterized by having an annular cross section with the strength of the hook 10 greatly increased through the use of a stiffening rib 22 integrally formed around the outer circumference of the semicircular bottom portion 14. The stiffening rib 22 extends upwardly along the length of the shank 12 and past the center of the overall length of the shank 12. In FIG. 1, line 6—6 intersects the center of the shank, and as shown, it can be seen that the stiffening rib 22 tapers inwardly above the center of the shank 12.

The semicircular top portion 16 also includes a stiffening rib 24 around the outer circumference and extending downwardly along the length of the shank 12 and past the center of the elongated shank 12.

In FIG. 2, an alternate embodiment of the shank 10 is shown which is identical to the hook 10 in FIG. 1 except for the increased length of the elongated shank 12. It can be appreciated that the length of the shank 12 may vary depending on how high or low it is desired to suspend the meat product from the support rack or which may often by the case, a combination of different size hooks 10 may be used in hanging various sizes of meat products.

In FIG. 2, a tensional force line is shown and designated by the alphabetical letter F. The force line F represents the tension placed on the hook 10 when the hook is suspended from the support rack and the meat hook 10 pivots to the left with the force line F becoming a vertical line. The arrows 26 represent the tensional force placed around the circumference of the bottom portion 14 and top portion 16. Through the use of the stiffening ribs 22 and 24, the tensional load placed on the hook 10 is distributed around the bottom portion 14 and top portion 16 and along the length of the shank 12. Through the use of the stiffening ribs 22 and 24, the hook 10 will carry over four times the tensional load when compared with prior art thermoplastic meat hooks having only an annular cross section without the stiffening ribs 22 and 24.

In FIG. 2A, the meat hook 10 is illustrated having a pointed end 26 which is similar to the pointed end 18. This embodiment of the meat hook 10 allows the hook 10 to be reversible and either the bottom portion 14 or top portion 16 may be used for receiving meat products thereon while the other end of the hook 10 is used for suspending the hook 10 on the support rack.

FIG. 3 shows a front view of the hook 10 shown in FIG. 1. In this view, the stiffening rib 22 can be seen tapered upwardly toward the pointed end 18 of the bottom portion 14.

In FIG. 4, a rear view of the hook 10 shown in FIG. 1 is illustrated. In this view, the rounded end 20 can be seen with the stiffening rib 24 shown tapered downwardly toward the end 20 of the top portion 16.

In FIG. 5, a cross section of the meat hook 10 is shown taken along lines 5—5 in FIG. 1. In this view, the annular cross section of the bottom portion 14 can be seen with the stiffening rib 22 integrally formed therein and extending downwardly from the outer circumference of the semicircular bottom portion 14.

In FIG. 6, a cross sectional view taken along lines 6—6 shown in FIG. 1 is illustrated. In this view, the stiffening ribs 22 and 24 are shown on opposite sides of the annular cross section of the shank 12 and extending outwardly therefrom. This structure, as mentioned under FIG. 1 and FIG. 2, reinforces the overall length of the shank 12 thereby reducing breakage along the length of the shank 12 when increased meat product loads are placed on the meat hook 10.

In FIG. 7, a cross sectional view of the top of the elongated shank 12 is shown taken along lines 7—7 shown in FIG. 1. In this view, the stiffening rib 24 can be seen integrally formed in the annular cross section of the shank 12.

Changes may be made in the construction and arrangement of the parts or elements of the embodiment as disclosed herein without departing from the spirit or scope of the invention as defined in the following claims.

We claim:

1. An improved thermoplastic meat hook, the hook comprising:

an elongated shank having an annular cross section;

a semicircular bottom portion integrally attached to said shank and having an annular cross section, said bottom portion having a stiffening rib extending outwardly and around the outer circumference of said bottom portion and extending upwardly along the length of said elongated shank and substantially past the center of the length of said elongated shank for distributing the load placed on said bottom portion equally around the circumference of said bottom portion and along the length of said shank, the end of said bottom portion is pointed for ease in inserting into meat products to be carried thereon; and a semicircular top portion integrally attached to said shank and having an annular cross section, said top portion having a stiffening rib extending outwardly around the outer circumference of said top portion and extending downwardly along the length of said elongated shank and substantially past the center of said elongated shank for distributing the load placed on said top portion equally around the circumference of said top portion and along the length of said shank, the tip end of said top portion is rounded for ease in placing said top portion on a support rack and suspending the meat therefrom;

said center of said elongated shank including stiffening ribs on opposite sides of its annular cross section so that the overall length of said elongated shank is strengthened by the stiffening ribs along the length thereof.

2. The meat hook as described in claim 1 wherein the end of said top portion is also pointed for inserting meat products thereon, said bottom portion and said top portion similar in dimension so that the meat hook may be reversible.

* * * * *